INVENTOR.
ALAN R. CRIPE

ATTORNEYS.

United States Patent Office 3,342,000
Patented Sept. 19, 1967

3,342,000
PANEL MOUNTING STRUCTURE
Alan R. Cripe, Richmond, Va., assignor to United Aircraft Corporation, East Hartford, Conn., a corporation of Delaware
Filed Jan. 3, 1966, Ser. No. 518,476
4 Claims. (Cl. 52—468)

ABSTRACT OF THE DISCLOSURE

A panel mounting structure having a spacer element of a plastic material which may be snapped into an aperture in a supporting wall and locked into place by means of a screw which passes through but does not contact the supporting wall. The spacer element is further characterized by an article supporting portion which cooperates with a mounting element to position a panel in spaced relation to the supporting wall.

BACKGROUND OF THE INVENTION

1. Field of the invention

This invention relates to mounting articles on and spaced from an apertured supporting member. More particularly, this invention is related to the supporting of articles where it is desired to establish a thermal barrier between the supporting member and the interior of the compartment into which the article extends. Accordingly, the general objects of this invention are to provide new and novel methods and apparatus of such character.

2. Description of the prior art

While not limited thereto in its utility, this invention has been found to be of particular value in mounting articles such as lining panels, trim strips, brackets, tracks and the like from the interior walls of vehicles. In mounting the aforementioned articles within an aircraft, highway vehicle or railway car, it is desirable to space the articles from the external wall of the vehicle and to provide acoustic and thermal insulation between the supporting wall and vehicle interior. It is also desirable, in order to minimize noise and vibration while simultaneously maximizing thermal insulation, that the means which provide such spacing be so constructed as to eliminate metal-to-metal contact between the exterior or supporting walls and the usable interior space of the vehicle. Employment on a vehicle, which will be mass produced and travel at high speeds, further dictates that the mounting means be lightweight, strong, easy to install and relatively inexpensive to produce.

SUMMARY OF THE INVENTION

This invention provides a new and improved manner of mounting articles within and spaced from an apertured supporting member. This novel mounting technique meets all the criteria noted above while aiding in the creation of a thermal barrier and thereby constitutes an improvement over the prior art.

It is therefore an object of this invention to provide a combination spacer-mounting means.

It is also an object of this invention to establish a thermal barrier between a supporting wall and an interior compartment at least partly defined by an object spaced from the wall and supported thereby.

It is another object of this invention to mount articles in spaced apart relationship to an apertured supporting member.

It is a further object of this invention to provide a mounting means which eliminates metal-to-metal contact between the article to be mounted and the supporting member.

It is yet another object of this invention to mount articles within and spaced from the exterior walls of a vehicle.

These and other objects of this invention are accomplished by providing a nonmetallic spacer which, through the action of a single fastener, is locked into an aperture in a supporting member. The article to be mounted is held against the free end of the spacer either by the fastener or other means and thermal and acoustic insulation is provided, partly by the spacer itself, between the supporting member and the plane defined by the free end of the spacer.

BRIEF DESCRIPTION OF THE DRAWING

This invention may be better understood and its numerous advantages will become apparent to those skilled in the art by reference to the accompanying drawing wherein like reference numerals refer to like elements in the various figures and in which.

DESCRIPTION OF THE PREFERRED EMBODIMENT

Figure 1:
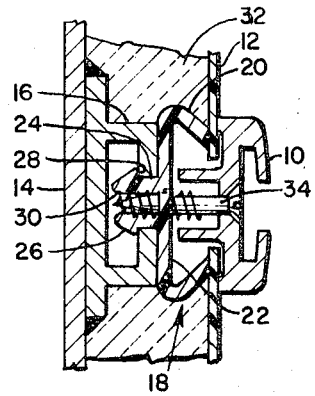
FIGURE 1 is a cross-sectional view of a first embodiment of this invention employed to mount a track and paneling from and in spacial relationship to a support.

Referring now to FIGURE 1, in the example situation to be described, it is desired to mount an aluminum drapery track 10 and vinyl covered aluminum interior panels 12 internally of a vehicle and spaced from the wall 14 thereof. In order to employ this invention, it is necessary that the supporting wall or member have an aperture or slot therein adjacent the point where the article is to be mounted. Accordingly, since it would be undesirable to have objects protruding from the back of vehicle wall 14, wall 14 has a slotted section 16 welded thereto. Section 16 is also aluminum and the continuous slot therein is positioned on the side facing the interior of the vehicle. The spacer-mounting member which comprises this invention is indicated generally at 18. Member 18 is preferably fabricated from an extrudable plastic such as rigid vinyl. However, other moldable, nonmetallic materials having sufficient mechanical strength may be used. The prime consideration, other than strength, in selecting a material for spacer 18 is that it have a low coefficient of thermal conductivity. Member 18 is comprised of a base segment which abuts the supporting member or wall, a second segment which extends inwardly from the base to contact and at least partly support the article or articles to be mounted and a third segment which locks the member in position in an aperture in the supporting member. In the example being described, this aperture is the continuous slot in section 16.

The inwardly extending segment of member 18 comprises flanges 20 which are generally, but not necessarily, angled toward one another as shown. The articles to be mounted, in this case track 10 and interior lining panels 12, will be supported by flanges 20. It should be noted that the angling of flanges 20, either toward or away from each other, coupled with the inherent flexibility of the rigid vinyl, enables the spacer-mounting member of this invention to accommodate various thickness interior panels. Track 10 has a plurality of holes in its base. During installation, the track is centered to place these holes, the purpose of which will be discussed below, over the gap defined by (between) the flanges 20.

The base segment portion of member 18, in the case of the embodiment of FIGURE 1, consists merely of a plate-like section 22. Flanges 20 radiate outwardly from opposite sides of section 22. The base segment and flanges cooperate to provide the desired spacing between wall 14 and lining 12. The presence of section 16 in the FIGURE 1 situation serves to minimize the amount of spacing which member 18 must provide. However, as will be shown and described below, the base segment (section 22) may have dependent portions extending therefrom toward the supporting wall so as to provide additional spacing.

The third portion of member 18 comprises an outwardly extending projection comprising a pair of flange segments 24. Flange segments 24, at their outer end, terminate in bodies 26 of initially increased cross-sectional area. These bodies of increased cross-sectional area are tapered inwardly towards their free ends and, in cooperation with the portions of flange segments 24 inwardly disposed therefrom, define shoulders 28. The portions of flange segments 24 inwardly disposed from shoulders 28 are equal in length to the thickness of the wall of section 16. Segments 24 also define a slot 30 therebetween. The combined width of the portions of flange segments 24 disposed between bodies 26 and base segment 22 and slot 30 is equal to the width of the slot in section 16. The span of shoulders 28 is thus greater than the width of the aperture in the supporting member. The width of each of shoulders 28 is approximately half the width of slot 30.

In installation, member 18, which will usually have a strip-like configuration, is placed in position over the slot in section 16. Member 18 is then forced against section 16 such that the tapered bodies 26, the tips of which fit into the slot in section 16, are urged inwardly. The presence of slot 30 between flange segments 24 permits the shoulders 28 to move toward one another, under the camming action of bodies 26, a sufficient distance such that the shoulders pass through the slot and into the interior of section 16.

After snapping spacer member 18 into position in the manner described above, a plurality of small holes are formed in base segment 22. These holes, which communicate with slot 30, are spaced apart the same distance as the holes in the bottom of track 10. It should be noted that, rather than being drilled on assembly, the holes in segment 22 may be formed prior to snapping member 18 in place. Alternatively, the holes may be fabricated subsequent to the positioning of track 10 over flanges 20.

In the usual instance, the next step comprises the placing of Fiberglas or foam insulation 32 against the interior surface of wall 14. Installation 32, which may either be in sheets or sprayed on wall 14, provides the desired thermal barrier. Next, the lining 12 is installed. Lining 12 generally is in sections or panels and the ends of adjacent sections will rest upon oppositely disposed flanges 20. Track 10 is then centered with the holes therein positioned over the space between flanges 20, which space is not covered by the lining panels, and a machine screw or other suitable fastener 34 is passed through the hole provided therefor in the base of track 10. Fastener 34 engages both the sides of the small hole formed in base segment 22 and flange segments 24 at opposite sides of slot 30. The diameter of fastener 34 is chosen to be greater than the width of slot 30 but smaller than the width of the slot in section 16. Screw 34 forces flange segments 24 outwardly against the sides of the slot in section 16. This outward movement, in turn, causes shoulders 28 to be spread apart and to engage the inner surfaces of the inner wall of member 16 on either side of the slot therein. Thus, fastener 34, by forcing flange segments 24 apart, prevents movement or withdrawal of member 18 while simultaneously holding track 10 in position. Tightening of fastener 34 also causes track 10 to clamp the panels 12 between itself and flanges 20. Due to the flexibility of flanges 18, panels 20 are free to float and thus thermally induced expansion and contraction of panels 12, without cracking or warping, is permitted. The above-described manner of mounting panels 12 also enables the panels to be fabricated with relatively large dimensional tolerances. As noted above, the spacer-mounting means of this invention will accept various interior panel thicknesses and accomplishes its mounting function without metal-to-metal contact between the interior of the compartment defined by panels 12 and the supporting wall 14.

Figure 2:
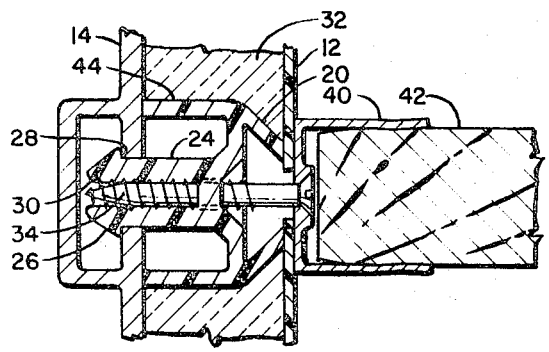
FIGURE 2 is a cross-sectional view of a second embodiment of this invention employed to mount a bracket and paneling from and in spacial relationship to a support.

Referring now to FIGURE 2, a second embodiment of this invention is shown. In the embodiment of FIGURE 2, the spacer-mounting means 18 of this invention is shown as being used to position an aluminum bracket 40 which supports a partition 42. In the FIGURE 2 situation, the vehicle wall is of tubular construction and the aperture which accepts member 16 is thus formed in wall 14 rather than being defined by a separate member welded thereto. Thus, to compensate for the spacing which was provided by slotted section 16 in the embodiment of FIGURE 1, base segment 22 of member 18 has a pair of outwardly extending projections or legs 44 formed thereon. The embodiment of FIGURE 2 is in all other respects, including functioning and installation, identical to the embodiment of FIGURE 1. In this embodiment, additional thermal and acoustic insulation may be achieved by filling the space between legs 44 and flange segments 24 with a material such as polyurethane.

Figure 3:
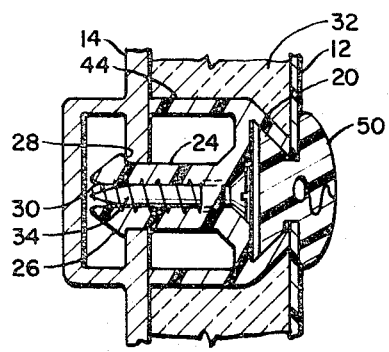
FIGURE 3 is a cross-sectional view of a third embodiment of this invention employed to mount paneling via a trim strip from and in spacial relationship to a support.

The spacer-mounting member of this invention, as shown in the embodiment of FIGURE 3, is similar to that shown in FIGURE 2. However, in the FIGURE 3 situation, the fastener 34 does not hold the object to be mounted. Rather, in the embodiment of FIGURE 3, a rubber of flexible vinyl piece 50 is snapped into the cavity defined by inwardly angled flanges 20. Piece 50 clamps lining panels 12 against the end of flanges 20 and thus hold the lining in place. Obviously, in the case of the embodiment of FIGURE 3, a shorter fastener or screw will be used than that employed in the other embodiments and this screw will be driven into base segment 22 until its head is flush with the surface thereof.

While preferred embodiments have been shown and described, various substitutions and modifications may be made without departing from the spirit and scope of this invention. Accordingly, it is to be understood that this invention has been described by way of illustration rather than limitation.

What is claimed is:

1. A panel mounting structure including in combination:

a support member having an aperture;
a spacer element positioned in said aperture, said spacer element including:
1. a base segment, at least a first part of said base segment being adapted to make contact with said support member,
2. first and second spaced apart opposed flanges extending from opposite edges from the side of said base segment removed from the side thereof which faces the support member, said flanges extending from said base segment at an angle other than 90°,
3. a projection extending from said base segment on the side thereof removed from said first and second flanges, said projections extending into the aperture in the said support member and being at least partly bifurcated into third and fourth opposed flange segments having a space therebetween,
4. a shoulder extending outwardly from each of said third and fourth opposed flange segments, the span between said shoulders being greater than the span of the aperture in the support member, said shoulders being adapted for insertion into the aperture in the support member, said spacing between the third and fourth flange segments allowing relative inward movement of said shoulders during insertion whereby said shoulders may be snapped into the aperture in the support member;

a mounting element positioned opposite to said first and second spaced apart flanges, said mounting element having an engaging surface;

a fastener having a diameter greater than the spacing between said third and fourth flange segments of said spacer element, said fastener being adapted to pass through said mounting element and said base segment of said spacer element and to extend into the space between said third and fourth flange segments whereby said third and fourth flange segments are urged apart and said shoulders engage the inner surface of the support member thus preventing removal of said spacer element from the aperture in the support member; and a panel member, at least a part of said panel member being held between said engaging surface of said mounting element and one of said first and second flanges.

2. The panel mounting structure of claim 1 wherein said first and second flanges of said spacer element are angled toward one another.

3. The panel mounting structure of claim 2 wherein said base segment, said first and second flanges and said third and fourth flange segments all consist of an extrudable, nonmetallic material having a low coefficient of thermal conductivity.

4. The panel mounting structure of claim 3 wherein said base segment of said spacer element comprises:

a first portion aligned substantially parallel to the surface of the support member; and a pair of legs extending from said first portion in the direction of said support member, said legs being shorter than said third and fourth opposed flange segments and being adapted to make contact with said support member.

References Cited
UNITED STATES PATENTS

| | | | |
|---|---|---|---|
| 2,788,047 | 4/1957 | Rapata | 85—80 |
| 2,984,698 | 5/1961 | Strauss | 85—80 X |
| 3,037,596 | 6/1962 | Fordyce | 24—73 X |
| 3,246,375 | 4/1966 | Landwer | 24—73 |
| 3,249,973 | 5/1966 | Seckerson | 24—73 |

ROY D. FRAZIER, *Primary Examiner.*

R. P. SEITTER, *Assistant Examiner.*